United States Patent [19]

Ehrentraut et al.

[11] Patent Number: 4,561,787
[45] Date of Patent: Dec. 31, 1985

[54] COMPOSITE SLIDING SURFACE BEARING

[75] Inventors: Otto Ehrentraut, Gmunden; Ulf G. Ederer, Laakirchen, both of Austria

[73] Assignee: Miba Gleitlager Aktiengesellschaft, Laakirchen, Austria

[21] Appl. No.: 702,362

[22] Filed: Feb. 15, 1985

[30] Foreign Application Priority Data

Feb. 27, 1984 [AT] Austria ................................. 628/84

[51] Int. Cl.$^4$ ............................................ F16C 33/12
[52] U.S. Cl. ..................... 384/295; 384/276; 308/3 R
[58] Field of Search ............... 384/295, 276, 292, 283, 384/282, 280, 95; 308/3 R

[56] References Cited

U.S. PATENT DOCUMENTS

| 3,077,285 | 2/1963 | Budininkas | 384/276 |
| 3,300,257 | 1/1967 | Selker et al. | 384/292 |
| 3,623,205 | 11/1971 | Scott | 384/276 |
| 4,400,099 | 8/1983 | Ehrentraut | 384/283 |

Primary Examiner—Lenard A. Footland
Attorney, Agent, or Firm—Kurt Kelman

[57] ABSTRACT

In a composite sliding surface bearing comprising a load-carrying backing shell, a bearing metal layer provided on the inside surface of the backing shell, and a sliding surface layer provided in the inside surface of the bearing metal layer, an interlayer is provided between the sliding surface layer and the bearing metal layer. In order to minimize the deleterious influence of the interlayer on the life of the composite sliding surface bearing, the bearing metal layer is formed on that surface which carries the interlayer with a profile having a depth which amounts to at least 5 micrometers and exceeds 1.5 times the thickness of the interlayer, which follows the profiled shape of the bearing metal layer.

2 Claims, 1 Drawing Figure

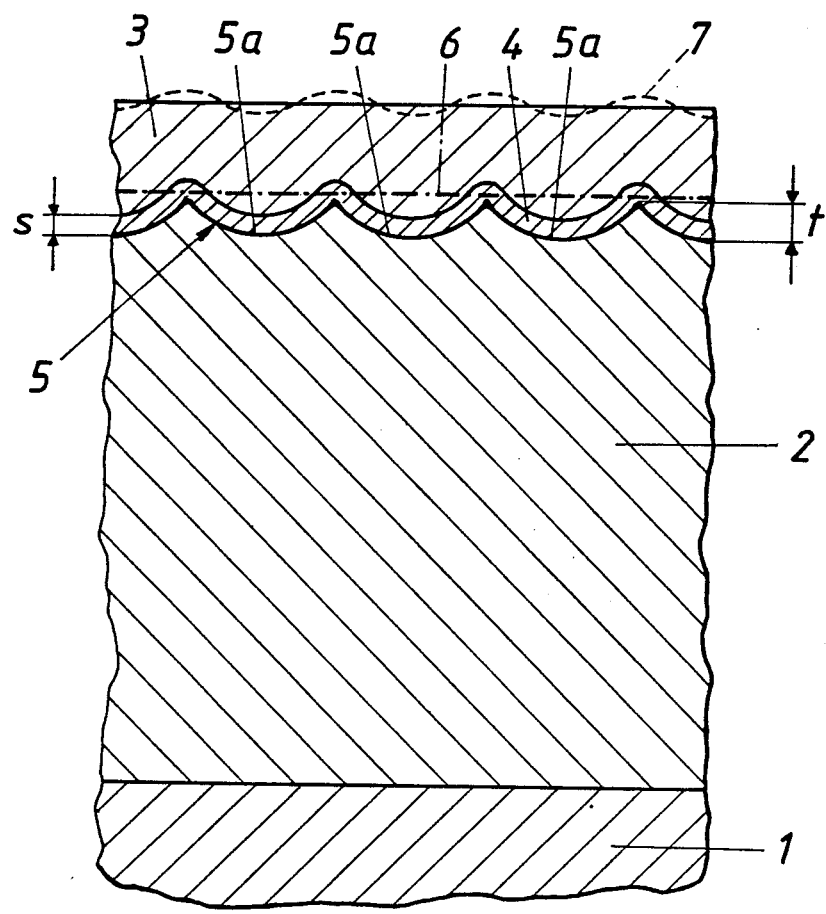

COMPOSITE SLIDING SURFACE BEARING

BACKGROUND OF THE INVENTION

1. Field of the Invention

This invention relates to a composite sliding surface bearing comprising a load-carrying backing shell, a bearing metal layer applied to the inside surface of the backing shell, an interlayer provided on the inside surface of the bearing metal layer, and a sliding surface layer provided on the inside surface of the interlayer.

2. Description of the Prior Art

So-called composite or laminated bearings have been provided to resist the dynamic and thermal loads to which high-duty bearings are subjected. An interlayer is provided between a relatively soft sliding surface layer and a relatively hard bearing metal layer. Such interlayers constitute diffusion barriers if they are associated with copper-containing sliding surface layers, or bonding layers if they are associated with sliding surface layers consisting of light alloys. Such interlayer usually consists of nickel and is much harder than the sliding surface layer so that a wear of the softer sliding surface layer will greatly increase the risk of a local overloading by disturbing influences because the interlayer will be effective on a larger proportion of the area of the sliding surface after such wear has occurred. Because the sliding surface layer should have a high surface finish, the bearing metal layer and the interlayer are also made to have a relatively small peak-to-valley height so that a wear of the sliding surface layer will result in a breakthrough of the interlayer over an area. For this reason it has been attempted to make the interlayer as thin as possible in order to promote a rapid wear of the interlayer. Whereas that step will promote the life of the bearing, it has the result that the diffusion barrier or bonding functions of the interlayer are eliminated in part. Besides, the application of a very thin interlayer can be effected only in a special process, which adds to the costs of manufacturing such bearings.

SUMMARY OF THE INVENTION

For this reason it is an object of the invention to avoid these disadvantages and so to improve a composite sliding surface bearing of the kind described first hereinbefore that an interlayer which is fully effective will exert a much smaller deleterious influence on the life of the bearing when the sliding surface bearing has been worn.

This object is accomplished in accordance with the invention in that that surface of the bearing metal layer which carries the interlayer is profiled in a depth which amounts to at least 5 micrometers and exceeds 1.5 times the thickness of the interlayer, which follows the profile.

Because the inside surface of the bearing metal layer is profiled, the application of the interlayer in an approximately constant thickness will result also in the formation of a profiled interlayer and as there is a lower limit to the depth of the profile of the interlayer said interlayer will not extend over a relatively large coherent surface area in any stage of the wear of the bearing. As a result, when wear has occurred, any surface portion of the sliding surface will always comprise a portion consisting of the relatively hard interlayer and a surface portion consisting of the relatively soft sliding surface layer and/or a surface portion consisting of the bearing metal layer, which carries the interlayer. In such surface portion said materials will exert a combined action, which will greatly reduce the danger of local grinding even when a large part of the sliding surface layer has been worn off.

A profiled interlayer will occupy only a relatively small part of the sliding surface when the sliding surface layer has been worn. For this reason the thickness of the interlayer is not highly critical so that the interlayer may have a relatively large thickness, if desired. The shape of the profiled surface of the bearing metal layer and particularly the depth of such profile will determine the proportion of the surface area of the sliding surface which will be occupied by the interlayer when the sliding surface layer has been worn. The depth of the profile should not be less than 5 micrometer.

In order to minimize local overloads, which may be due to foreign particles, the profiled surface may be formed with substantially peripherally extending grooves. Such grooves are formed also in the interlayer and will virtually preclude an embedding of hard foreign particles in the relatively hard material of the interlayer because such foreign particles will move mainly in the peripheral direction and during such movement will not contact boundary zones extending transversely to the peripheral direction. Besides, the hydrodynamic lubricating film in the transitional zones between the relatively hard and relatively soft bearing materials will not be disturbed by boundary zones extending transversely to the peripheral direction.

BRIEF DESCRIPTION OF THE DRAWING

The drawing is a diagrammatic transverse sectional view showing a composite sliding surface bearing which embodies the invention.

DETAILED DESCRIPTION OF THE PREFERRED EMBODIMENT

The composite sliding surface bearing shown by way of example comprises a backing shell 1 of steel, which is provided on its inside surface with a bearing metal layer 2 consisting of a light alloy or bronze alloy. That bearing metal layer 2 is provided on its inside surface with a sliding surface layer 3, which consists, e.g., of a lead-tin-copper alloy. An interlayer 4 of nickel is provided between the sliding surface layer 3 and the bearing metal layer 2. The difference from conventional sliding surface bearings of that kind resides in that the interlayer 4 is not applied to the bearing metal layer 2 on a surface which is as smooth as possible but is applied thereto in an at least approximately even thickness on a surface 5 which has a profiled shape so that the interlayer 4 is profiled too. The surface 5 has a profile depth t which is at least 5 micrometers and exceeds 1.5 times the thickness s of the interlayer so that any wear of the sliding surface layer 3, regardless of the extent of such wear, will always result in a sliding surface which is occupied in part by the interlayer 4 and in part by the sliding surface layer 3 and/or the bearing metal layer 2. This is apparent from dash-dot line 6, which indicates a given wear. The depth t of the profile preferably exceeds twice the thickness s of the interlayer 4 so that the possible proportion of the sliding surface which is occupied by the interlayer will be further reduced.

It is also apparent from the drawing that the profiled surface 5 is formed with substantially peripherally extending grooves 5a, which have been formed, e.g., in that the bearing metal layer 2 was machined with a lathe tool. Owing to that orientation of such grooves, relatively large particles will not be shifted from the relatively soft materials of the sliding surface layer and/or the bearing metal layer into the relatively hard interlayer, where they would form points of disturbance resulting in local overloads.

It is apparent that the measures adopted in accordance with the invention have the result that a wear of the sliding surface layer to any extent will not result in a sliding surface which is occupied by the interlayer in a relatively large coherent area so that the deleterious influence of that interlayer on the life will be greatly reduced. In that respect, the initial shape of the sliding surface 3 will not be significant and the sliding surface may initially be profiled too, as is indicated by the dotted line 7.

We claim:

1. In a composite sliding surface bearing comprising
    a backing shell having an inside surface,
    a bearing metal layer provided on the inside surface of said backing shell and having an inside surface,
    an interlayer provided on the inside surface of said bearing metal layer and having an inside surface, and
    a sliding surface layer provided on the inside surface of said interlayer,
    the improvement residing in that
    said inside surface of said bearing metal layer is profiled in a depth which amounts to at least 5 micrometers and exceeds 1.5 times the thickness of said interlayer and
    said interlayer has a substantially constant thickness and conforms to the profiled inside surface of said bearing metal layer.

2. The improvement set forth in claim 1, wherein said inside surface of said bearing metal layer is formed with substantially peripherally extending recesses.

* * * * *